(12) United States Patent
Fassezke et al.

(10) Patent No.: US 10,106,207 B2
(45) Date of Patent: Oct. 23, 2018

(54) CARGO BED DIVIDING MEMBER SUPPORT STRUCTURES

(71) Applicant: Toyota Motor Engineering & Manufacturing North America, Inc., Erlanger, KY (US)

(72) Inventors: Ethan D. Fassezke, Mason, MI (US); Ryan C. Harris, Saline, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 1 day.

(21) Appl. No.: 15/349,296

(22) Filed: Nov. 11, 2016

(65) Prior Publication Data

US 2018/0134327 A1    May 17, 2018

(51) Int. Cl.
*B62D 33/023* (2006.01)
*B60P 7/14* (2006.01)
*B60R 13/01* (2006.01)

(52) U.S. Cl.
CPC .............. *B62D 33/023* (2013.01); *B60P 7/14* (2013.01); *B60R 13/01* (2013.01); *B60Y 2200/14* (2013.01)

(58) Field of Classification Search
CPC .......... B62D 33/023; B60P 7/14; B60R 13/01; B60Y 2200/14
See application file for complete search history.

(56) References Cited

U.S. PATENT DOCUMENTS 5,720,507 A    2/1998  Emery
5,788,309 A    8/1998  Emery et al.

*Primary Examiner* — D Glenn Dayoan
*Assistant Examiner* — Melissa A Black
(74) *Attorney, Agent, or Firm* — Christopher G. Darrow; Darrow Mustafa PC

(57) ABSTRACT

A support structure for a vehicle cargo bed dividing member includes a base, a first projection extending from the base, and a second projection extending from the base opposite the first projection so as to define a first cavity therebetween. The first projection defines a cavity first wall portion, and the second projection defines a cavity second wall portion positioned opposite the cavity first wall portion. The first projection also defines a cavity third wall portion extending opposite the cavity second wall portion from an end of the cavity first wall portion and in a direction away from the cavity second wall portion. The cavity third wall portion and the cavity second wall portion are structured to maintain a cargo bed dividing member in a pre-support position prior to positioning of the dividing member between the cavity second wall portion and the cavity first wall portion.

25 Claims, 6 Drawing Sheets

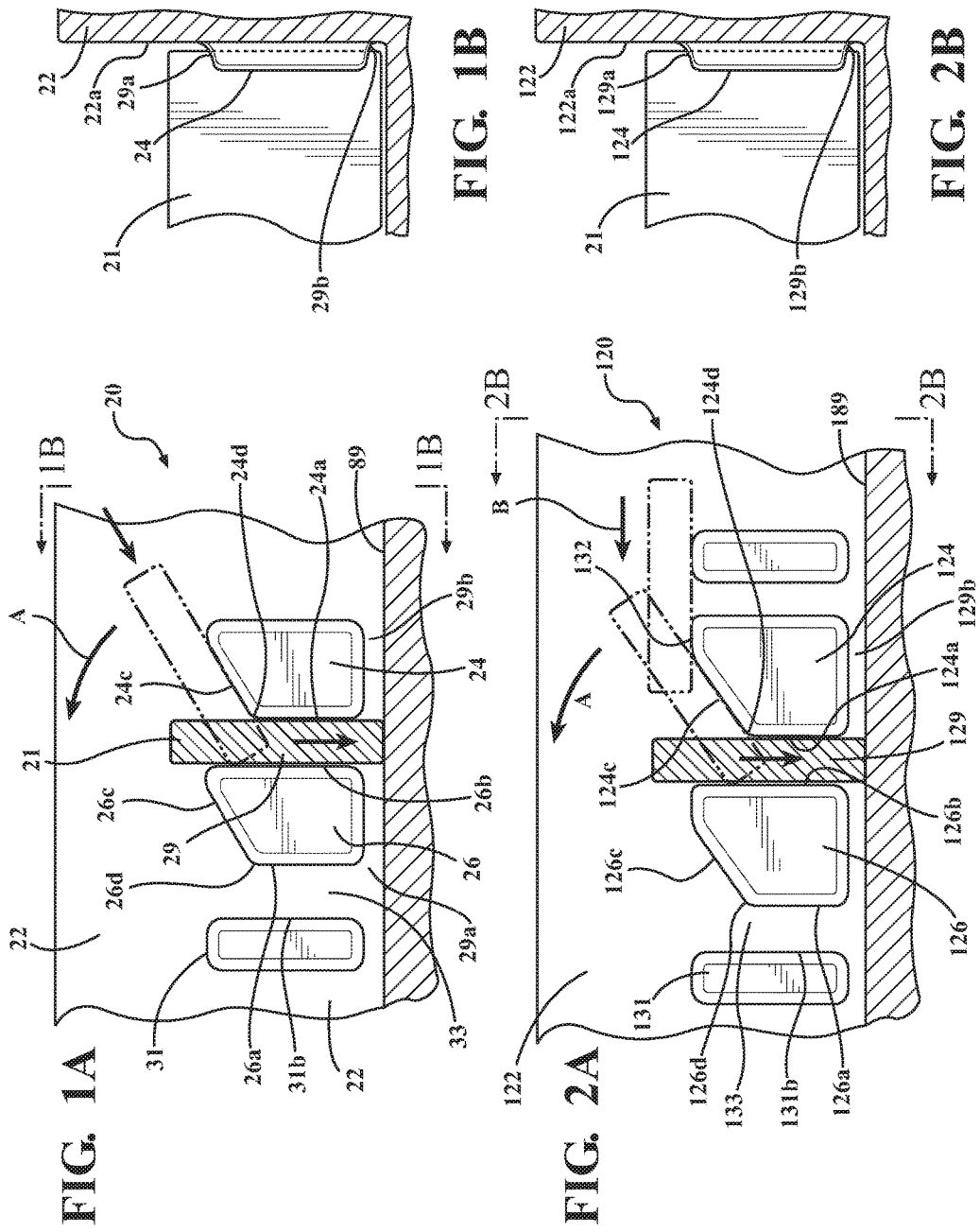

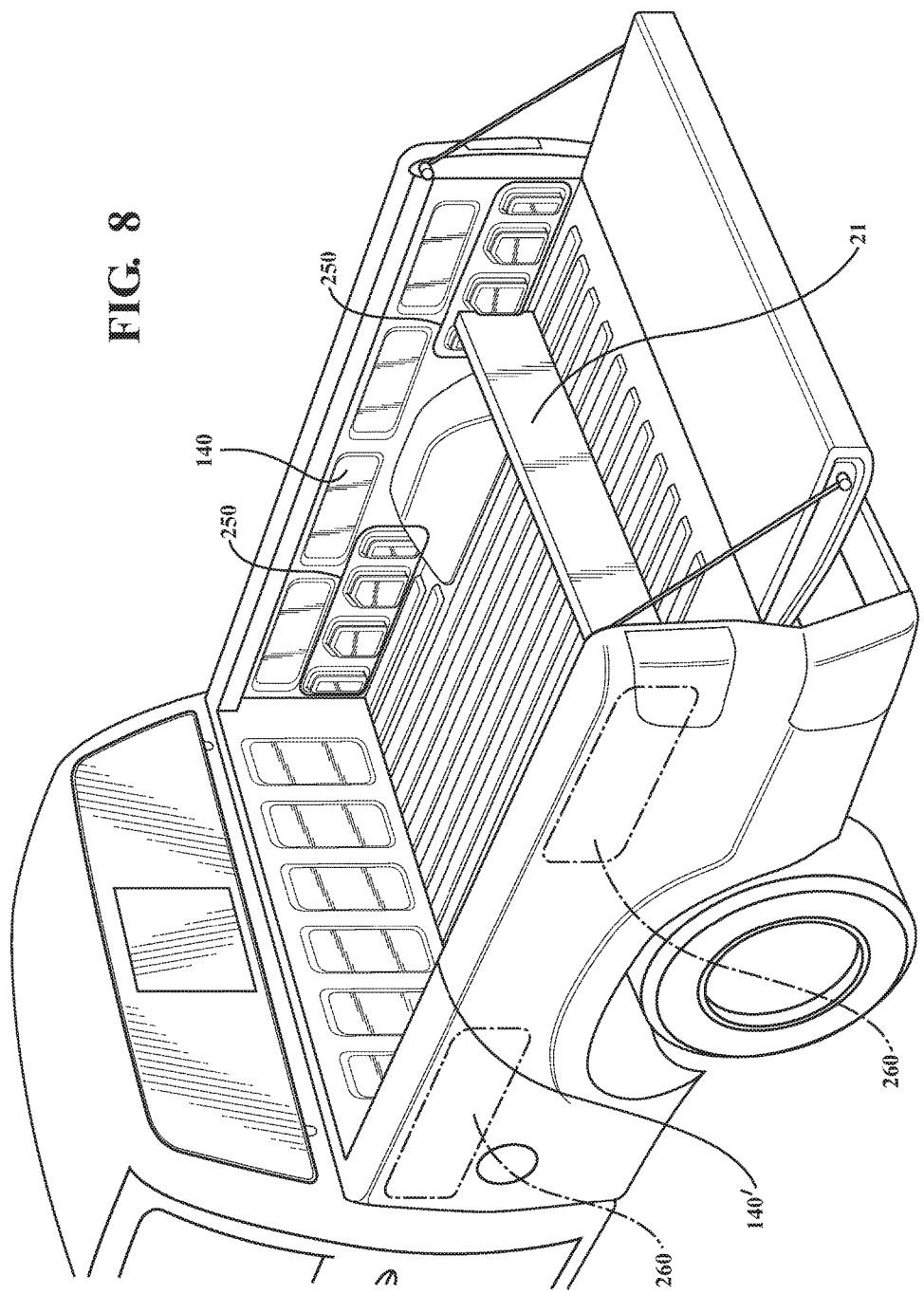

US 10,106,207 B2

CARGO BED DIVIDING MEMBER SUPPORT STRUCTURES

TECHNICAL FIELD

The present invention relates to structures used for partitioning or dividing the available space in vehicle cargo beds.

BACKGROUND

The space in vehicle cargo beds (for example, in beds in pickup trucks) may be divided according to the needs of a user, by using various types of adjustable partitions. In one application, ends of boards or pieces of plywood may be supported by slots formed in the sidewalls of the cargo bed. However, in cases where the boards are supported vertically along edges thereof, the boards must be dropped into the slot vertically, forcing the user to position the board directly above the slot. For certain locations in the cargo bed, this may be difficult for the user to do without climbing into the bed or leaning forward at an uncomfortable angle.

SUMMARY

In one aspect of the embodiments described herein, a support structure for a vehicle cargo bed dividing member is provided. The support structure includes a base, a first projection extending from the base, and a second projection extending from the base opposite the first projection so as to define a first cavity therebetween. The first projection defines a cavity first wall portion, and the second projection defines a cavity second wall portion positioned opposite the cavity first wall portion. The first projection also defines a cavity third wall portion extending opposite the cavity second wall portion from an end of the cavity first wall portion and in a direction away from the cavity second wall portion. The cavity third wall portion and the cavity second wall portion are structured to maintain a cargo bed dividing member in a pre-support position prior to positioning of the dividing member between the cavity second wall portion and the cavity first wall portion.

In another aspect of the embodiments described herein, a vehicle cargo bed dividing member support module is provided. The module includes a base, a first projection extending from the base, and a second projection extending from the base opposite the first projection so as to form a cargo bed dividing member-receiving cavity between the first and second projections. The module is structured to be positionable along a sidewall of a vehicle cargo bed.

In another aspect of the embodiments described herein, a support structure for a vehicle cargo bed dividing member is provided. The support structure includes a base, a first projection extending from the base, and a second projection extending from the base opposite the first projection so as to define a first cavity therebetween. The first projection defines a cavity first wall portion, and the second projection defines a cavity second wall portion positioned opposite the cavity first wall portion. The first projection also defines a cavity third wall portion extending opposite the cavity second wall portion from an end of the cavity first wall portion and in a direction away from the cavity second wall portion. The cavity second wall portion has a curved surface and a sloped surface extending from the curved surface. The cavity third wall portion is structured to guide a cargo bed dividing member into contact with one of the curved surface and the sloped surface. The cavity second wall portion curved surface and sloped surface are structured such that a cargo bed dividing member in contact with the second projection is directed, under the force of its own weight, into a supported position within the first cavity.

BRIEF DESCRIPTION OF THE DRAWINGS

FIG. 1A is a schematic side view of one embodiment of a support structure designed to support one end of a cargo bed dividing member in a vehicle cargo bed.

FIG. 1B is an end view of the support structure shown in FIG. 1A.

FIG. 2A is a schematic side view of another embodiment of a support structure designed to support one end of a cargo bed dividing member in a vehicle cargo bed.

FIG. 2B is an end view of the support structure shown in FIG. 2A.

FIG. 8 is a schematic perspective view of the embodiment of the cargo bed dividing member support structure shown in FIGS. 2A and 2B incorporated into a separately-formed module structured to be positionable along and securable to a sidewall of a vehicle cargo bed.

DETAILED DESCRIPTION

Figure 1C:
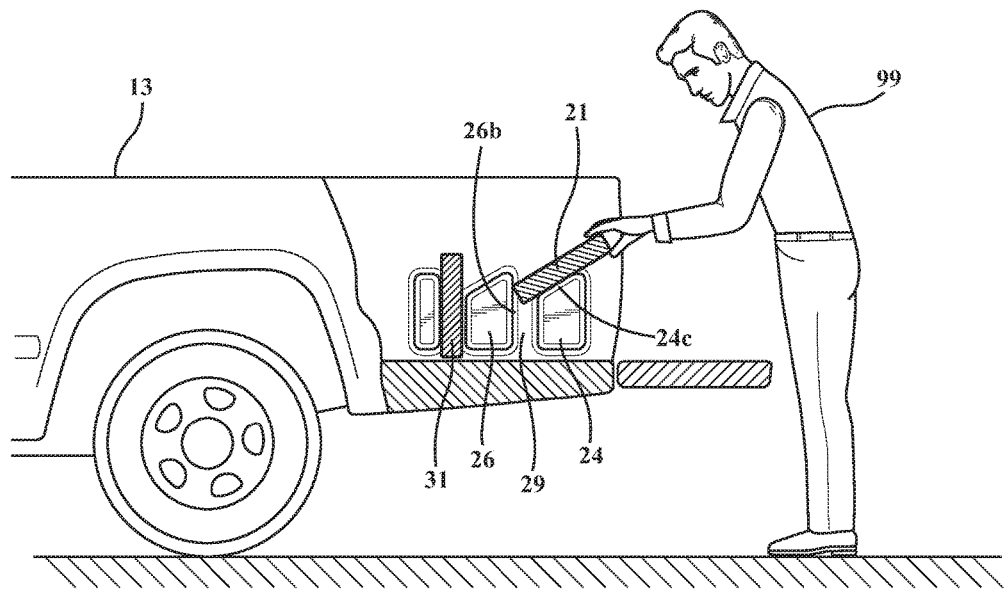
FIG. 1C is a schematic side view showing a user inserting a cargo bed dividing member into a cavity formed in a support structure as shown in FIGS. 1A and 1B.

Embodiments described herein relate to various support structures for a vehicle cargo bed dividing member. The support structures enable a cargo bed dividing member to be positioned and maintained in a pre-support position prior to positioning of the dividing member in a final supported position in a slot or cavity in which the dividing member is supported in a vertical orientation. From the pre-support position, the dividing member may be rotated by a user until it reaches a vertical orientation, at which time it drops into the cavity and into the support position. Alternatively, support structure may be configured so that a user may drop or slide the dividing member into an upper portion of the cavity, after which the dividing member continues to rotate and drop into the support position under its own weight. This eliminates the need for a user to reach into the cargo bed and/or pre-orient the dividing member in a vertical orientation prior to insertion of the dividing member into the cavity.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

FIG. 1A is a schematic side view of one embodiment of a support structure 20 designed to support one end of a cargo bed dividing member 21 in a vehicle cargo bed. FIG. 1B is an end view of the support structure shown in FIG. 1A. The cargo bed may reside in a pickup truck or any other suitable vehicle. In the embodiment shown in FIG. 1A, the support structure 20 includes a base 22, a first projection 24 extending from the base 22, and a second projection 26 extending from the base 22 adjacent the first projection 24 so as to define a first cavity 29 therebetween. The first projection 24 defines a cavity first wall portion 24a. The second projection 26 defines a cavity second wall portion 26b positioned opposite the cavity first wall portion 24a so as to form a first cavity 29 therebetween. Cavity 29 may be structured for receiving a suitably-sized cargo bed dividing member therein. The first projection 24 also defines a cavity third wall portion 24c extending directly opposite the cavity second wall portion 26b and from an end of the cavity first wall portion 24a, in a direction away from the cavity second wall portion 26b. The cavity third wall portion 24c may include a radiused portion 24d intersecting the cavity first wall portion 24a. As shown in FIG. 1A, the first projection 24 may be separate from the second projection 26. Radii (such as radii 29a and 29b of FIG. 1B, for example) may be formed at intersections between each of the first and second projections 24 and 26 and the base 22, wherever the projections extend from the base 22. In certain embodiments, the base 22 from which the first and second projections 24 and 26 extend may have a flat or planar base surface (such as surface 22a). The first and second projections 24 and 26 may extend out of the plane of the base surface 22a. FIGS. 1A and 1B also show an end of a cargo bed dividing member 21 positioned within the first cavity 29 formed between the first and second cavity wall portions 24a and 26b.

In addition, the first and second projections 24 and 26 are structured so that the cavity third wall portion and the cavity second wall portion may maintain a cargo bed dividing member in a pre-support position prior to positioning of the cargo bed dividing member between the cavity second wall portion 26b and the cavity first wall portion 24a. FIG. 1A shows a side view of a cargo bed dividing member in phantom, in an example of such a pre-support position. The cargo bed dividing member may reside in the pre-support position prior to rotation of the cargo bed dividing member by a user. Rotation by the user in direction "A" from the pre-support position toward the cavity first wall portion 24a causes the cargo bed dividing member to drop into the portion of the cavity between the cavity second wall portion 26b and the cavity first wall portion 24a, as described herein.

At least a portion of the cavity second wall portion 26b may extend parallel (within applicable tolerance limits) to the cavity first wall portion 24a. In the particular embodiment shown in FIG. 1A, the cavity second wall portion 26b extends parallel to the cavity first wall portion 24a along substantially the entire length of the cavity second wall portion.

In the embodiment shown in FIGS. 1A and 1B, an third projection 31 may also extend from the base 22 opposite second projection 26, so as to form a second cavity 33 between the second projection 26 and the third projection 31. Cavity 33 may be similar to the cavity 29 previously described. That is, the second projection 26 may define a cavity first wall portion 26a for second cavity 33. The third projection 31 may define a cavity second wall portion 31b positioned opposite the cavity first wall portion 26a so as to form second cavity 33 therebetween. Cavity second wall portion 31b may extend parallel to cavity second wall portion 26b previously described. Cavity 33 may be structured for receiving a suitably-sized cargo bed dividing member therein, similar to dividing member 21.

The second projection 26 also defines a cavity third wall portion 26c extending directly opposite the cavity second wall portion 31b and from an end of the cavity first wall portion 26a, in a direction away from the cavity second wall portion 31b. The cavity third wall portion 26c may include a radiused portion 26d intersecting the cavity first wall portion 26a. As shown in FIG. 1A, the third projection 31 may be separate from the first projection 24 and the second projection 26. Radii (similar to previously described radii 29a and 29b, for example) may be formed at intersections between the third projection 31 and the base 22, wherever the projection 31 extends from the base. The third projection 31 may extend out of the plane of the base surface 22a, as previously described with regard to first and second projections 24 and 26. In certain embodiments, the radii formed between the projections 24, 26, 31 (and similar projections of other embodiments described herein) may be in the range of 0-20 millimeters. Projections 24, 26, 31 may be formed in base 22 using any suitable method, for example, by molding or stamping.

FIG. 1C is a schematic side view showing a user 99 inserting a cargo bed dividing member 21 into a cavity 29 formed in a support structure 20 as shown in FIGS. 1A and 1B. The support structure in FIG. 1C is incorporated into a sidewall of a cargo bed of a pickup truck 13. To insert a cargo bed dividing member 21 into cavity 29, the dividing member 21 may be placed onto cavity third wall portion 24c by a user so that an end of the dividing member 21 rests against cavity second wall portion 26b. The cargo bed dividing member 21 may rest in this pre-support position until further movement by the user. The user may then rotate the dividing member 21 in direction "A" of FIG. 1A until the dividing member 21 drops further into cavity 29 and into a supported position of the dividing member, with an end of the dividing member resting on and supported by a floor 89 of the cargo bed or a bed liner containing the support structure. For example, the user may apply an impulse force to the cargo bed dividing member 21, forcing the dividing member to rotate away form the user's hand. When the dividing member 21 has rotated to a vertical orientation, the dividing member may then fall into the space between the cavity second wall portion 26b and the cavity first wall portion 24a.

FIGS. 2A and 2B show a support structure 120 in accordance with another embodiment having features similar to those shown in FIGS. 1A and 1B. Support structure 120 includes a base 122, a first projection 124 extending from the base 122, and a second projection 126 extending from the base 122 adjacent the first projection 124. The first projection 124 defines a cavity first wall portion 124a. The second projection 126 defines a cavity second wall portion 126b positioned opposite the cavity first wall portion 124a so as to form a first cavity 129 therebetween. The first projection 124 also defines a cavity third wall portion 124c extending directly opposite the cavity second wall portion 126b from an end of the cavity first wall portion 124a, and in a direction away from the cavity second wall portion 126b. The cavity third wall portion 124c may include a radiused portion 124d intersecting the cavity first wall portion 124a. As shown in FIG. 2A, the first projection 124 may be separate from the second projection 126. Radii (such as radii 129a and 129b) may be formed at intersections between each of the first and second projections 124 and 126 and the base 122, wherever the projections extend from the first base.

In the embodiment shown in FIGS. 2A and 2B, the first projection 124 also defines a surface 132 extending from an end of the cavity third wall portion 124c in a direction away from the cavity second wall portion 126b. In a particular embodiment, the surface 132 extending from the end of the cavity third wall portion 124c is structured to extend horizontally when the first projection 124 is positioned a cargo bed of a vehicle. This enables a vehicle cargo bed dividing member 21 to be rested on the surface 132 prior to the vehicle cargo bed dividing member 21 being pushed toward and rotated into the first cavity 129 formed between the cavity first wall portion 124a and the cavity second wall portion 126b. This ability to pre-position the vehicle cargo bed dividing member 21 prior to insertion into the first cavity 129 may ease the burden on a user in case the weight of the vehicle cargo bed dividing member 21 is excessive or where the user might otherwise find initial positioning of the vehicle cargo bed dividing member to be difficult.

In certain embodiments, the base 122 from which the first and second projections extend may have a planar base surface (such as surface 122a). The first and second projections 124 and 126 may extend out of the plane of the base surface 122a, as previously described with regard to first and second projections 24 and 26. In the embodiment shown in FIGS. 2A and 2B, an third projection 131 may also extend from the base 122 opposite second projection 126, so as to form a second cavity 133 between the second projection 126 and the third projection 131. Third projection 131 may be similar to third projection 31 previously described. Cavity 133 may be similar to the cavity 129 previously described. That is, the second projection 126 defines a cavity first wall portion 126a for second cavity 133. The third projection 131 defines a cavity second wall portion 131b positioned opposite the cavity first wall portion 126a so as to form second cavity 133 therebetween. Cavity second wall portion 131b may extend parallel to cavity second wall portion 126b previously described. Cavity 133 may be structured for receiving a suitably-sized cargo bed dividing member therein, similar to dividing member 21.

The second projection 126 also defines a cavity third wall portion 126c extending directly opposite the cavity second wall portion 131b from an end of the cavity first wall portion 126a, in a direction away from the cavity second wall portion 131b. The cavity third wall portion 126c may include a radiused portion 126d intersecting the cavity first wall portion 126a. As shown in FIG. 1A, the third projection 131 may be separate from the first projection 124 and the second projection 126. Radii (such as radii 129a and 129b previously described, for example) may be formed at intersections between the third projection 131 and the base 122, wherever the third projection 131 extends from the base. The third projection 131 may extend out of the plane of the base surface 122a, as previously described with regard to first and second projections 124 and 126.

To insert a cargo bed dividing member 21 into cavity 129, the dividing member 21 may be placed onto surface 132 and then urged in direction "B" until an end of the dividing member 21 tips over and rotates onto cavity third wall portion 124c, coming to rest against cavity second wall portion 126b. Further rotation of the dividing member in direction "A" by the user causes the dividing member 21 to drop further into cavity 129 and into a supported position of the dividing member, with an end of the dividing member resting on and supported by a floor 189 of the cargo bed or a bed liner containing the support structure.

Figure 3:
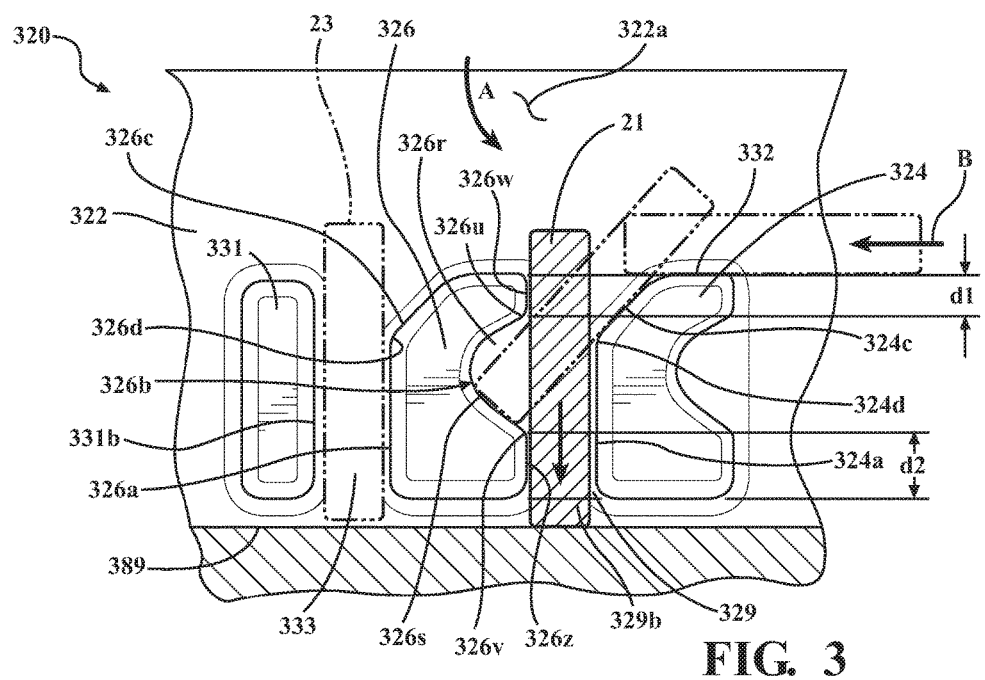
FIG. 3 is a schematic side view of another embodiment of a support structure designed to support one end of a cargo bed dividing member in a vehicle cargo bed.

FIG. 3 shows an additional embodiment 320 of the cargo bed dividing member support structure having features similar to those shown in FIGS. 2A and 2B. Support structure 320 includes a base 322, a first projection 324 extending from the base 322, and a second projection 326 extending from the base 322 adjacent the first projection 324. The first projection 324 defines a cavity first wall portion 324a. The second projection 326 defines a cavity second wall portion 326b positioned opposite the cavity first wall portion 324a so as to form a first cavity 329 therebetween. The first projection 324 also defines a cavity third wall portion 324c extending directly opposite the cavity second wall portion 326b from an end of the cavity first wall portion 324a, in a direction away from the cavity second wall portion 326b. The cavity third wall portion 324c may include a radiused portion 324d intersecting the cavity first wall portion 324a. As shown in FIG. 3, the first projection 324 may be separate from the second projection 326. Radii as previously described (not shown) may be formed at intersections between each of the first and second projections 324 and 326 and the base 322, wherever the projections extend from the first base.

In certain embodiments, the base 322 from which the first and second projections extend may have a flat or planar base surface (such as surface 322a) similar to base surface 22a of FIGS. 1A and 1B. The first and second projections 324 and 326 may extend out of the plane of the base surface 322a, as previously described with regard to first and second projections 24 and 26. In the embodiment shown in FIG. 3, the first projection 324 also defines a surface 332 extending from an end of the cavity third wall portion 324c in a direction away from the cavity second wall portion 326b. In a particular embodiment, the surface 332 extending from the end of the cavity third wall portion 324c is structured to extend horizontally when the first projection 324 is positioned a cargo bed of a vehicle. This enables a vehicle cargo bed dividing member 21 to be rested on the surface 332 prior to the vehicle cargo bed dividing member 21 being pushed toward and rotated into the first cavity 329 formed between the cavity first wall portion 324a and the cavity second wall portion 326b.

In the embodiment shown in FIG. 3, a third projection 331 may also extend from the base 322 opposite second projection 326, so as to form a second cavity 333 between the second projection 326 and the third projection 331. Third projection 331 may be similar to third projection 31 previously described. Cavity 333 may be similar to the cavity 329 previously described. That is, cavity 333 may be structured for receiving a suitably-sized cargo bed dividing member 23 therein, similar to dividing member 21.

The second projection 326 defines a cavity first wall portion 326a for second cavity 333. The third projection 331 defines a cavity second wall portion 331b positioned opposite and extending parallel to the cavity first wall portion 326a so as to form second cavity 333 therebetween. The second projection 326 also defines a cavity third wall portion 326c extending directly opposite the cavity second wall portion 331b from an end of the cavity first wall portion 326a, in a direction away from the cavity second wall portion 331b. The cavity third wall portion 326c may include a radiused portion 326d intersecting the cavity first wall portion 326a. As shown in FIG. 3A, the third projection 331 may be separate from the first projection 324 and the second projection 326. Radii as previously described (not shown) may be formed at intersections between the third projection 331 and the base 322 wherever the third projection 331 extends from the base. The third projection 331 may extend out of the plane of the flat base surface 322a. The first, second, and third projections 324, 326, and 331 extend from the base 322 in a manner similar to the projections in the previously-described embodiments.

In the embodiment shown in FIG. 3, the cavity second wall portion 326b also includes a curved surface 326s formed therealong. The curved surface 326s may form a cavity 326r structured for receiving a portion of a cargo bed dividing member 21 therein, prior to rotation of the cargo bed dividing member 21 to its supported position (shown as a solid line in FIG. 3). In addition, the cavity third wall portion 324c may be structured to guide a portion of the cargo bed dividing member 21 into contact with the curved surface 326s.

In a particular embodiment, the curved surface 326s is semi-circular. The curved surface 326s may form radii 326u and 326v, with a first support surface 326w formed at a first end of the first cavity 329 and a second support surface 326z formed at a second end of the first cavity opposite the first end. In the embodiment shown, the first end of the cavity 329 is an upper end of the cavity, and the second end of the cavity is a lower end of the cavity. First and second support surfaces 326w and 326z may both be straight and may both extend parallel to cavity first wall portion 324a. In a particular embodiment, first support surface 326w may have a length d1 of a minimum of 20 millimeters. First and second support surfaces are structured to contact and support end portions of a cargo bed dividing member when the cargo bed dividing member is supported in a vertical support position within the cargo bed, as shown in FIG. 3. In a particular embodiment, second support surface 326z may have a length d2 of a minimum of 20 millimeters. In addition, when the cargo bed dividing member 21 is in the support position, the cargo bed dividing member is also supported by cavity first wall portion 324a which forms a third support surface along an opposite side of the cavity 329.

To insert a cargo bed dividing member 21 into cavity 329, the dividing member 21 may be placed onto surface 332 and then urged in direction "B" until an end of the dividing member 21 tips over and rotates onto cavity third wall portion 324c, sliding along cavity third wall portion 324c and into cavity 328r until it comes to rest against curved surface 328s. Further rotation of the dividing member in direction "A" by the user causes the dividing member 21 to drop further into cavity 329 and into a supported position of the dividing member, with an end of the dividing member resting on and supported by a floor 389 of the cargo bed or a bed liner containing the support structure. The provision of curved surface 328s may enable the dividing member 21 to be inserted further into cavity 329 prior to final rotation of the dividing member 21 into its final supported position.

Figure 4:
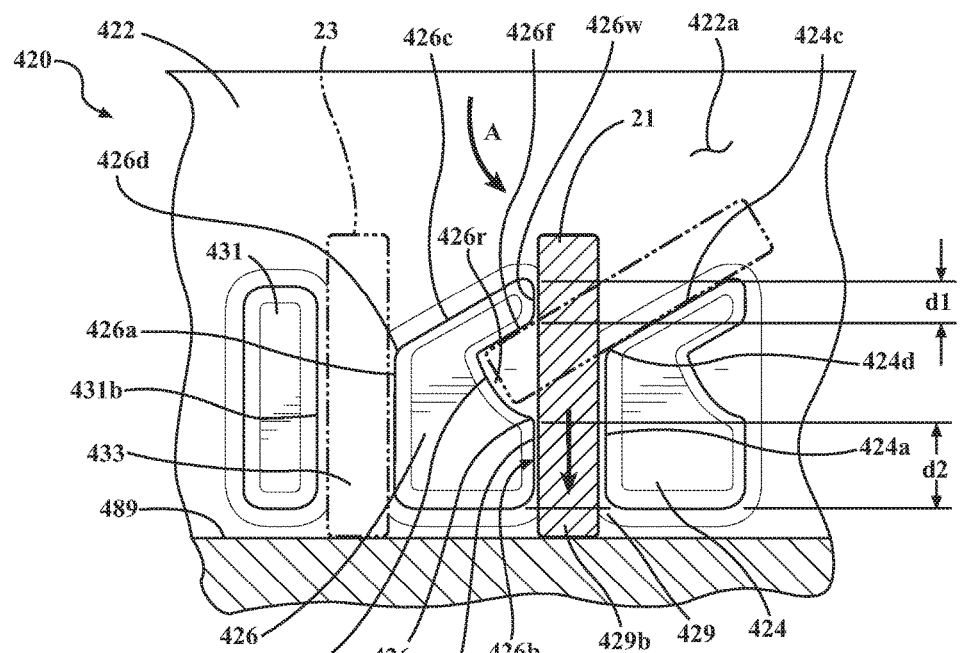
FIG. 4 is a schematic side view of another embodiment of a support structure designed to support one end of a cargo bed dividing member in a vehicle cargo bed.

FIG. 4 shows an additional embodiment 420 of the cargo bed dividing member support structure. Support structure 420 includes a base 422, a first projection 424 extending from the base 422, and a second projection 426 extending from the base 422 adjacent the first projection 424. The first projection 424 defines a cavity first wall portion 424a. The second projection 426 defines a cavity second wall portion 426b positioned opposite the cavity first wall portion 424a so as to form a first cavity 429 therebetween. The first projection 424 also defines a cavity third wall portion 424c extending directly opposite the cavity second wall portion 426b from an end of the cavity first wall portion 424a, and in a direction away from the cavity second wall portion 426b. The cavity third wall portion 424c may include a radiused portion 424d intersecting the cavity first wall portion 424a. As shown in FIG. 4, the first projection 424 may be separate from the second projection 426. Radii as previously described (not shown) may be formed at intersections between each of the first and second projections 424 and 426 and the base 422, wherever the projections extend from the first base.

In this embodiment, the cavity second wall portion 426b includes a curved surface 426s formed therealong. The curved surface 426s may define a cavity 426r (or a portion of a cavity) structured for receiving a portion of the cargo bed dividing member therein. In addition, the cavity third wall portion 424c may be structured to guide a portion of a cargo bed dividing member 21 into contact with the curved surface 426s. In this particular embodiment, the cavity second wall portion 426b portion also includes a straight surface 426f formed therealong. The straight surface 426f and the curved surface 426s may be structured as shown so that the curved surface 426s extends from the straight surface 426f in a direction toward the cavity first wall portion 424a. The curved surface 426s may also form a radius 426n with a portion of the cavity second wall portion 426b extending parallel to cavity first wall portion 424a.

In a particular embodiment, the curved surface 426s is semi-circular. A first support surface 426w may be formed at a first end of the first cavity 429 and a second support surface 426z of the cavity second wall portion 426b may be formed at a second end of the first cavity opposite the first end. In particular embodiments, first support surface 426w and second support surface 426z may both be straight and may extend parallel to cavity first wall portion 424a. First support surface 426w and second support surface 426z may be coplanar with each other so that, when the cargo bed dividing member 21 is in the support position, the cargo bed dividing member may be supported along and by first support surface 426w and second support surface 426z. In a particular embodiment, first support surface 426w may have a length d1 of a minimum of 20 millimeters. In a particular embodiment, second support surface 426z may have a length of a minimum of 20 millimeters. In addition, when the cargo bed dividing member 21 is in the support position, the cargo bed dividing member is also supported by cavity first wall portion 424a which forms a third support surface along an opposite side of the cavity 429.

In the embodiment shown in FIG. 4, a third projection 431 may also extend from the base 422 opposite second projection 426, so as to form a second cavity 433 between the second projection 426 and the third projection 431. Third projection 431 may be similar to third projection 31 previously described. Cavity 433 may be similar to the cavity 429 previously described. That is, cavity 433 may be structured for receiving a suitably-sized cargo bed dividing member 23 therein, similar to dividing member 21.

The second projection 426 defines a cavity first wall portion 426a for second cavity 433. The third projection 431 defines a cavity second wall portion 431b positioned opposite the cavity first wall portion 426a so as to form second cavity 433 therebetween. The second projection 426 also defines a cavity third wall portion 426c extending directly opposite the cavity second wall portion 431b from an end of the cavity first wall portion 426a, and in a direction away from the cavity second wall portion 431b. The cavity third wall portion 426c may include a radiused portion 426d intersecting the cavity first wall portion 426a. As shown in FIG. 4, the third projection 431 may be separate from the first projection 424 and the second projection 426. Radii as previously described (not shown) may be formed at intersections between the third projection 431 and the base 422, wherever the third projection 431 extends from the base.

In certain embodiments, the base 422 from which the first and second projections extend may have a planar base surface (such as surface 422a) similar to base surface 22a of FIGS. 1A and 1B. The first, second, and third projections 424, 426, and 431 may extend out of the plane of the base surface 422a, as previously described with regard to first and second projections 24, 26, and 31.

To insert a cargo bed dividing member 21 into cavity 429, the dividing member 21 may be placed onto surface 424c. Dividing member 21 may slide along the inclined surface of cavity third wall portion 424c until it abuts curved surface 426s. A user may then rotate the dividing member 21 in direction "A", causing the dividing member 21 to slide along the surface 426s until it drops further into cavity 429 and into a supported position of the dividing member, with an end of the dividing member resting on and supported by a floor 489 of the cargo bed or a bed liner containing the support structure. The provision of curved surface 426s may enable the dividing member 21 to be inserted further into cavity 429 prior to final rotation of the dividing member 21 into its final supported position.

Figure 5:
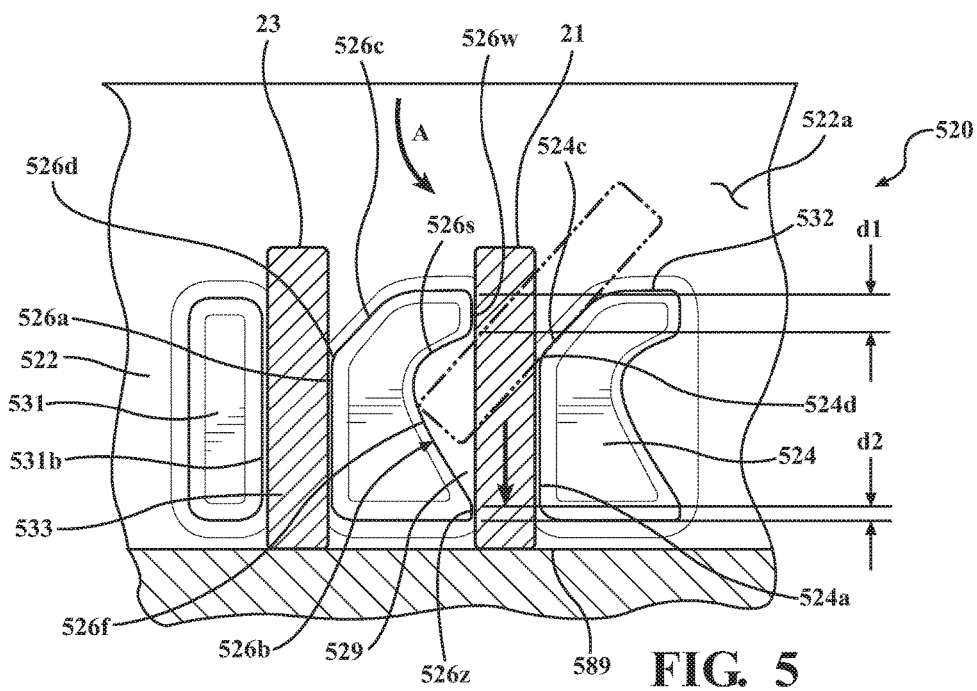
FIG. 5 is a schematic side view of another embodiment of a support structure designed to support one end of a cargo bed dividing member in a vehicle cargo bed.

FIG. 5 shows an additional embodiment 520 of the cargo bed dividing member support structure. Support structure 520 includes a base 522, a first projection 524 extending from the base 522, and a second projection 526 extending from the base 522 adjacent the first projection 524 as to define a first cavity 529 therebetween. The first projection 524 defines a cavity first wall portion 524a. The second projection 526 defines a cavity second wall portion 526b positioned opposite the cavity first wall portion 524a so as to form a first cavity 529 therebetween. The first projection 524 also defines a cavity third wall portion 524c extending directly opposite the cavity second wall portion 526b from an end of the cavity first wall portion 524a, and in a direction away from the cavity second wall portion 526b. The cavity third wall portion 524c may include a radiused portion 524d intersecting the cavity first wall portion 524a. As shown in FIG. 4, the first projection 524 may be separate from the second projection 526. Radii as previously described (not shown) may be formed at intersections between each of the first and second projections 524 and 526 and the base 522, wherever the projections extend from the first base.

A first support surface 526w may be formed at a first end of the first cavity 529, and a second support surface 526z of the cavity second wall portion 526b may be formed at a second end of the first cavity opposite the first end. In the embodiment shown, the first end of the cavity is an upper end of the cavity, and the second end of the cavity is a lower end of the cavity.

First support surface 526w and second support surface 526z may be coplanar with each other so that, when the cargo bed dividing member 21 is in the support position, the cargo bed dividing member may be supported along and by first support surface 526w and second support surface 526z. In particular embodiments, first support surface 526w and second support surface 526z may both be straight and may extend parallel to cavity first wall portion 524a. In a particular embodiment, first support surface 526w may have a length d1 of a minimum of 20 millimeters. In a particular embodiment, second support surface 526z may have a length d2 of a minimum of 20 millimeters. In addition, when the cargo bed dividing member 21 is in the support position, the cargo bed dividing member is also supported by cavity first wall portion 524a which forms a third support surface along an opposite side of the cavity 529.

In the embodiment shown in FIG. 5, a third projection 531 may also extend from the base 522 opposite second projection 526, so as to form a second cavity 533 between the second projection 526 and the third projection 531. Third projection 531 may be similar to third projection 31 previously described. Cavity 533 may be similar to the cavity 529 previously described. That is, cavity 533 may be structured for receiving a suitably-sized cargo bed dividing member 23 therein, similar to dividing member 21.

The second projection 526 also defines a cavity first wall portion 526a for second cavity 533. The third projection 531 defines a cavity second wall portion 531b positioned opposite and extending parallel to the cavity first wall portion 526a so as to form second cavity 533 therebetween. The second projection 526 also defines a cavity third wall portion 526c extending directly opposite the cavity second wall portion 531b from an end of the cavity first wall portion 526a, in a direction away from the cavity second wall portion 531b. The cavity third wall portion 526c may include a radiused portion 526d intersecting the cavity first wall portion 526a. As shown in FIG. 5, the third projection 531 may be separate from the first projection 524 and the second projection 526. Radii as previously described (not shown) may be formed at intersections between the third projection 531 and the base 522, wherever the third projection 531 extends from the base. In the embodiment shown in FIG. 5, the first projection 524 also defines a surface 532 extending from an end of the cavity third wall portion 524c in a direction away from the cavity second wall portion 526b. In a particular embodiment, the surface 532 extending from the end of the cavity third wall portion 524c is structured to extend horizontally when the first projection 524 is positioned a cargo bed of a vehicle. This enables a vehicle cargo bed dividing member 21 to be rested on the surface 532 prior to the vehicle cargo bed dividing member 21 being pushed toward and rotated into the first cavity 529 formed between the cavity first wall portion 524a and the cavity second wall portion 526b.

In certain embodiments, the base 522 from which the first, second, and third projections extend may have a planar base surface (such as surface 522a) similar to base surface 22a of FIGS. 1A and 1B. The first, second, and third projections 524, 526, and 531, respectively, may extend out of the plane of the base surface 522a, as previously described with regard to first, second, and third projections 24, 26, and 31.

In this embodiment, the cavity second wall portion 526b includes a curved surface 526s formed therealong. In addition, the cavity third wall portion 524c may be structured to guide a portion of a cargo bed dividing member 21 into contact with the curved surface 526s. Also, in this particular embodiment, the cavity second wall portion 526b also includes a straight, sloped surface 526f formed therealong. Surface 526f is sloped with respect to a plane extending perpendicular to a floor 589 of the cargo bed or a bed liner containing the support structure. The straight surface 526f and the curved surface 526s may be structured as shown so that the sloped surface 526f extends from the curved surface 526s in a direction toward the cavity first wall portion 524a. In addition, as seen in FIG. 5, the cavity second wall portion curved surface 526s and sloped surface 526f may be structured to automatically direct a portion of a cargo bed dividing member 21 into a supported, vertical position (shown as a solid outline of cargo bed dividing member 21 in FIG. 5) within the first cavity.

To insert a cargo bed dividing member 21 into cavity 529, the dividing member 21 may be placed onto surface 532 and then urged in direction "B" until an end of the dividing member 21 tips over and rotates onto cavity third wall portion 524c, sliding along cavity third wall portion 524c until it abuts curved surface 526s or sloped surface 526f (depending on the angle of cavity third wall portion 524c with respect to cavity second wall portion 526b). Curved surface 526s and sloped surface 526f are structured such that, after the cargo bed dividing member 21 contacts one of the curved surface 526s and the sloped surface 526f of cavity second wall portion 526b, the cargo bed dividing member 21 continues to rotate in direction "A" and to slide down the curved surface 526s or sloped surface 526f under its own weight, without any need for further manual manipulation by a user. The cargo bed dividing member 21 slides down the sloped surface 526f until it comes to rest in its support position (shown as a solid outline of the dividing member), at which time it contacts the floor 589 of the cargo bed or a bed liner containing the support structure. Thus, the cavity second wall portion curved surface 526s and sloped surface 526f are structured such that a cargo bed dividing member 21 in contact with the second projection 526 is directed, under the force of its own weight, into the vertically-oriented, supported position within the first cavity.

Figure 6:
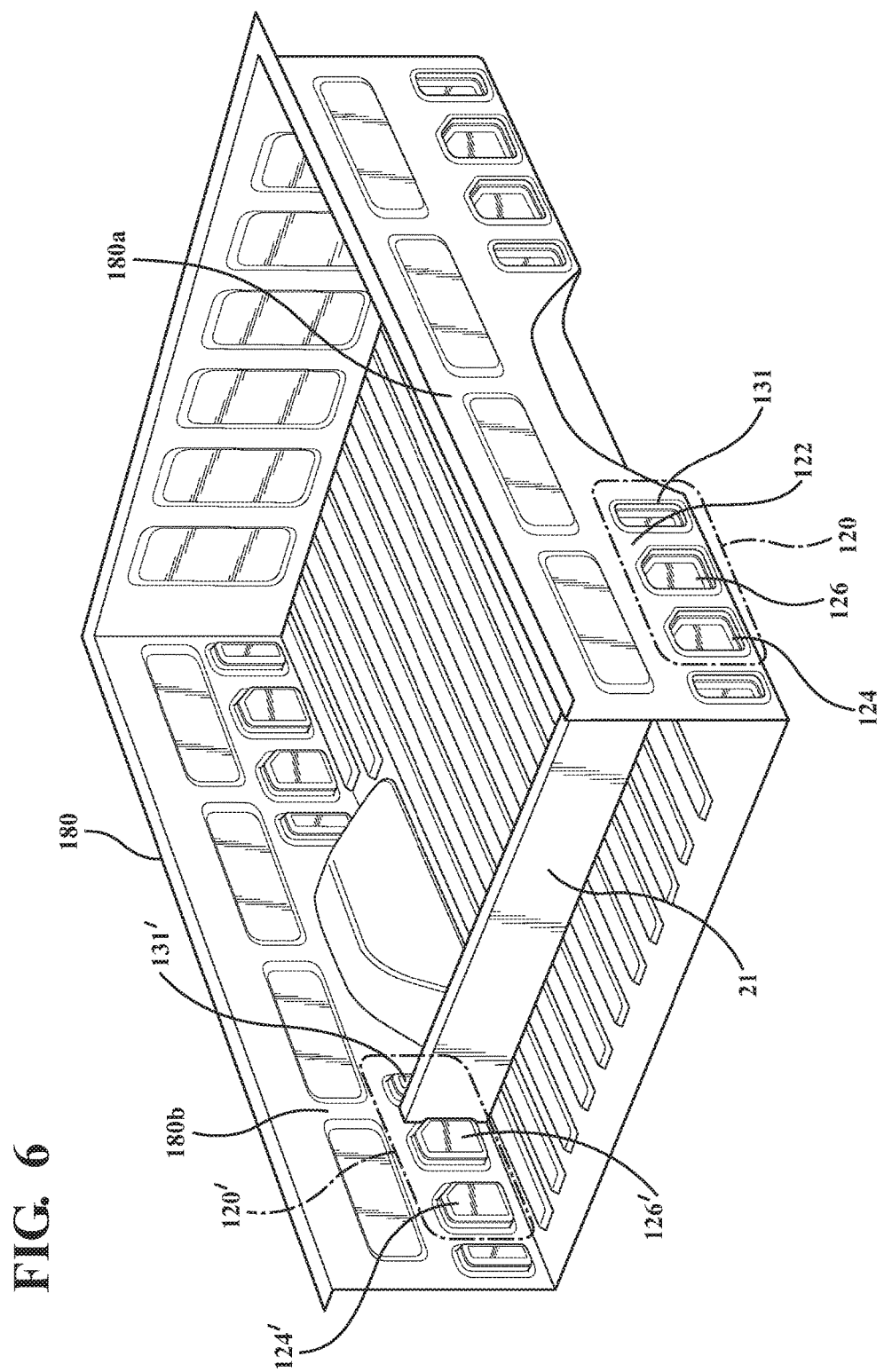
FIG. 6 is a schematic perspective view of the embodiment of the cargo bed dividing member support structure shown in FIGS. 2A and 2B incorporated into a bed-liner which is structured to be positionable and securable in a vehicle cargo bed.

The various embodiments of the cargo bed dividing member support structure described herein may be incorporated into any of a variety of elements or structures. For example, FIG. 6 shows the embodiment of the cargo bed dividing member support structure of FIGS. 2A and 2B incorporated into a bed-liner 180 which is structured to be positionable and securable in a vehicle cargo bed. The base surface 122a from which the first, second, and third projections 124, 126, and 131 extend may be a surface of a sidewall 180a of the bedliner. The bed liner 180 may be formed through a single sheet thermoforming process and from thermoplastic sheet stock such as one-quarter inch thick high density polyethylene, for example. In the thermoforming process a one-sided thermoforming vacuum mold may have a plurality of vacuum ports through which air is drawn to draw a heated thermoplastic sheet against the mold to form the sheet in general conformity to the shape of the mold. Other methods of forming the bedliner may also be employed.

Also, as shown in FIG. 6, one or more complementary support structures 120', each incorporating a mirror image of the support structure 120 may be incorporated into a side 180b of the bedliner 180 residing opposite sidewall 180a. Features of the support structure 120' may be positioned directly opposite corresponding similar features of the support structure 120, so that both ends of a cargo bed dividing member may be guided along corresponding portions of the support structures 120 and 120' and into associated support positions during insertion of the dividing member 21 into an associated cavity as described herein. The planar base surface 122a' from which first, second, and third projections 124', 126', 131' (similar to previously described projections 124, 126, and 131) extend may be a surface of the sidewall 180b of the bedliner.

Figure 7:
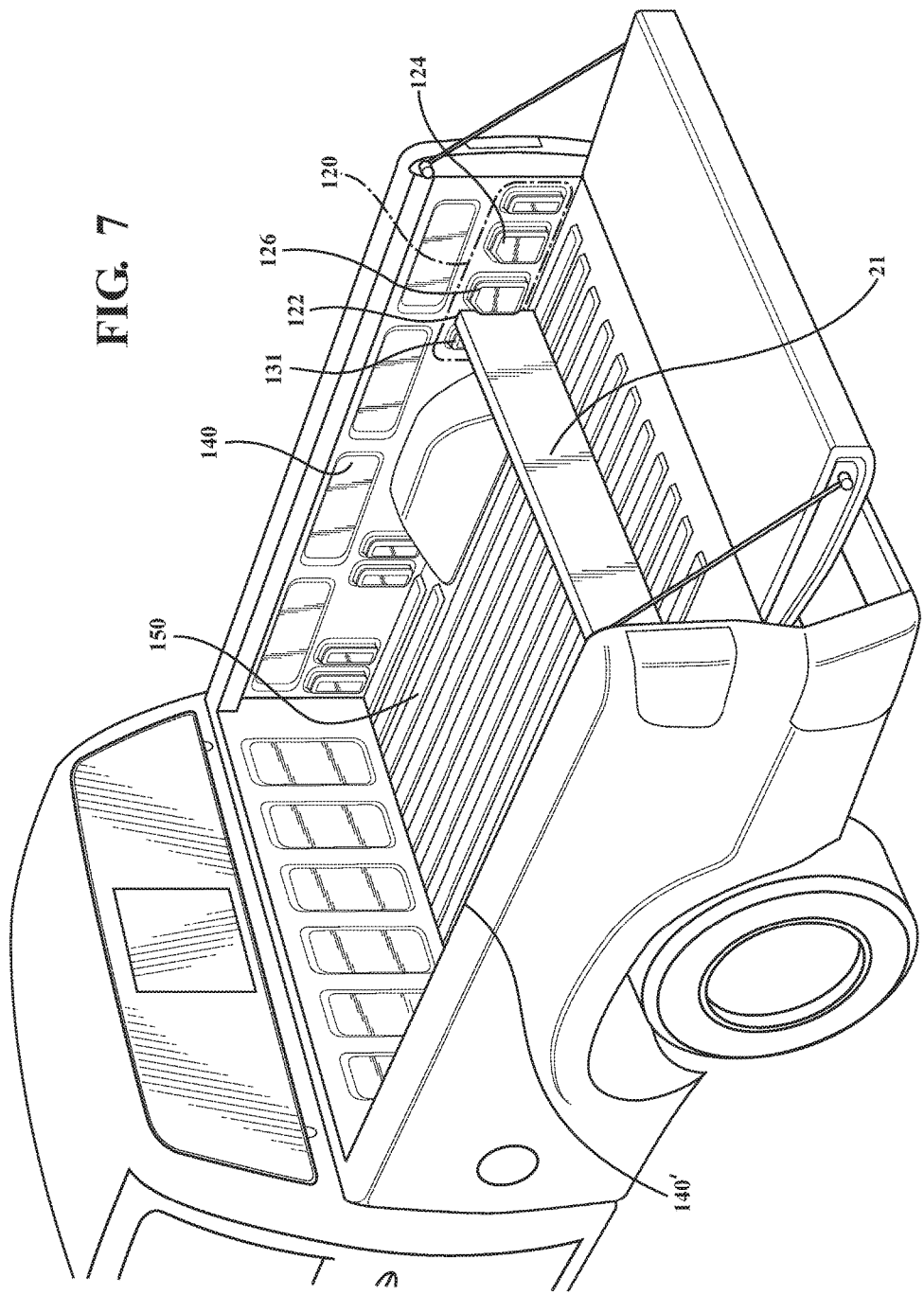
FIG. 7 is a schematic perspective view of the embodiment of the cargo bed dividing member support structure shown in FIGS. 2A and 2B incorporated into a sidewall of a vehicle cargo bed.

FIG. 7 shows the support structure embodiment 120 of FIGS. 2A and 2B incorporated into a sidewall of a vehicle cargo bed. As shown in FIG. 7, the base 122 from which the first and second projections 124 and 126 extend may be a surface of a sidewall 140 of the vehicle cargo bed, generally designated 150. In such embodiments, the first and second projections 124 and 126 may be formed directly into the sidewall 140 and may extend from the sidewall 140 toward the cargo bed interior. The sidewall 140 may be formed from any suitable material or materials, such as a metallic material or a polymer.

Also, one or more complementary support structures 120' (not shown in FIG. 7), each incorporating a mirror image of the support structure 120, may be incorporated into an opposite sidewall 140' of the cargo bed. Features of the support structure 120' may be positioned directly opposite corresponding similar features of the support structure 120 as previously described with regard to FIG. 6, so that opposite ends of a cargo bed dividing member 21 may be guided along corresponding portions of the support structures 120 and 120' and into associated support positions during insertion of the dividing member into an associated cavity as described herein.

In addition, as shown in FIG. 8, embodiments of the cargo bed dividing member support structure described herein may also be incorporated into a vehicle cargo bed dividing member support module 250 structured to be positionable along and securable to a sidewall of a vehicle cargo bed. This enables a given dividing member support structure to be positioned at any location along the bed sidewall according to available space and/or user preferences. In addition, referring to FIG. 8, modules 250 may be positioned and secured to multiple locations along a given sidewall. Also, one or more complementary modules 260, each incorporating a mirror image of the support structure incorporated into modules 250, may be positioned and secured to a bed sidewall 140' directly opposite the sidewall 140, thereby enabling opposite ends of a cargo bed dividing member 21 to be supported along opposite sidewalls of the cargo bed. Both ends of a cargo bed dividing member 21 may be guided along corresponding portions of the support structures 120 and 120' and into associated support positions during insertion of the dividing member into an associated cavity as described herein. Modules 250 and 260 may also be securable to a bed liner which is positionable and securable in the cargo bed.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A support structure for a vehicle cargo bed dividing member, the support structure comprising:
   a base;
   a first projection extending from the base; and
   a second projection extending from the base opposite the first projection so as to define a first cavity therebetween,
   the first projection defining a first cavity first wall portion,
   the second projection defining a first cavity second wall portion positioned opposite the first cavity first wall portion, the first projection also defining a first cavity third wall portion extending opposite the first cavity second wall portion from an end of the first cavity first wall portion and in a direction away from the first cavity second wall portion, the first cavity third wall portion and the first cavity second wall portion being structured to maintain a cargo bed dividing member in a pre-support position within the first cavity prior to positioning of the cargo bed dividing member between the first cavity second wall portion and the first cavity first wall portion.

2. The support structure of claim 1 wherein at least a portion of the first cavity second wall portion extends parallel to the first cavity first wall portion.

3. The support structure of claim 1 wherein the base has a planar base surface, and wherein the first and second projections extend out of a plane of the base surface.

4. The support structure of claim 1 wherein the first projection is separate from the second projection.

5. The support structure of claim 1 wherein the base is a sidewall of a vehicle cargo bed.

6. A bed-liner including a support structure in accordance with claim 1, wherein the bed-liner is structured to be positionable in a vehicle cargo bed.

7. A module including a support structure in accordance with claim 1, wherein the module is structured to be positionable along and securable to either one of a first location along a sidewall of a vehicle cargo bed, and a second location along the sidewall of the vehicle cargo bed different from the first location.

8. The support structure of claim 1 wherein the first projection further defines a surface extending from an end of the first cavity third wall portion in a direction away from the first cavity second wall portion.

9. The support structure of claim 8 wherein the surface extending from the end of the first cavity third wall portion is structured to extend horizontally when the first projection is positioned a cargo bed of a vehicle.

10. The support structure of claim 1 wherein the first cavity second wall portion includes a curved surface formed therealong.

11. The support structure of claim 10 wherein the support structure is structured to enable rotation about the first projection of a portion of a cargo bed dividing member in contact with the first cavity second wall portion curved surface, and wherein the rotation is in a direction toward the first cavity first wall portion.

12. The support structure of claim 10 wherein the first cavity third wall portion is structured to guide a portion of a cargo bed dividing member into contact with the curved surface.

13. The support structure of claim 10 wherein the first cavity second wall portion is partially defined by a straight surface, and wherein the curved surface extends from the straight surface in a direction toward the first cavity first wall portion.

14. The support structure of claim 10 wherein the first cavity second wall portion is partially defined by a straight surface, and wherein the straight surface extends from the curved surface in a direction toward the first cavity first wall portion.

15. The support structure of claim 10 wherein the first cavity second wall portion includes a first support surface positioned at a first end of the first cavity, the first support surface being structured to contact a portion of a cargo bed dividing member when the cargo bed dividing member is in a supported position in a cargo bed; and a second support surface positioned at a second end of the first cavity opposite the first end, the second support surface being structured to contact a portion of the cargo bed dividing member when the cargo bed dividing member is in a supported position in the cargo bed, wherein the first and second support surfaces are coplanar.

16. The support structure of claim 15 wherein the first cavity first wall portion forms a third support surface structured to contact a portion of the cargo bed dividing member when the cargo bed dividing member is in the supported position in the cargo bed.

17. A vehicle cargo bed dividing member support module comprising:
a base;
a first projection extending from the base; and
a second projection extending from the base opposite the first projection so as to form a cargo bed dividing member-receiving cavity between the first and second projections, wherein the support module is structured to be positionable and securable to either one of a first location along a sidewall of a vehicle cargo bed, and a second location along the sidewall of the vehicle cargo bed different from the first location.

18. The support module of claim 17 wherein the first projection defines a cavity first wall portion, the second projection defines a cavity second wall portion positioned opposite the cavity first wall portion to form a first cavity therebetween, and wherein the first projection also defines a first cavity third wall portion extending opposite the first cavity first wall portion from an end of the first cavity second wall portion, in a direction away from the first cavity second wall portion.

19. The support module of claim 18 further comprising a third projection extending from the base opposite the second projection so as to form a cargo bed dividing member-receiving second cavity between the second and third projections.

20. A support structure for a vehicle cargo bed dividing member, the support structure comprising:
a base;
a first projection extending from the base; and
a second projection extending from the base opposite the first projection so as to define a first cavity therebetween,
the first projection defining a first cavity first wall portion, the second projection defining a first cavity second wall portion positioned opposite the first cavity first wall portion, the first projection also defining a first cavity third wall portion extending opposite the first cavity second wall portion from an end of the first cavity first wall portion and in a direction away from the first cavity second wall portion,
the first cavity second wall portion having a curved surface and a straight surface extending from the curved surface, wherein the first cavity third wall portion is structured to guide a cargo bed dividing member into contact with one of the curved surface and the straight surface, and wherein the first cavity second wall portion curved surface and straight surface are structured such that a cargo bed dividing member in contact with the second projection is directed, under a force of its own weight, into a supported position within the first cavity.

21. A support structure for a vehicle cargo bed dividing member, the support structure comprising a first module and a second module, each of the first module and the second module including:
- a base;
- a first projection extending from the base; and
- a second projection extending from the base opposite the first projection so as to define a first cavity therebetween,
- the first projection defining a first cavity first wall portion,
- the second projection defining a first cavity second wall portion positioned opposite the first cavity first wall portion, the first projection also defining a first cavity third wall portion extending opposite the first cavity second wall portion from an end of the first cavity first wall portion and in a direction away from the first cavity second wall portion,
- the first module being structured to be positionable along a first side of a cargo bed, the second module being structured to be positionable independently of the first module along a second side of the cargo bed opposite the first side of the cargo bed, for supporting a cargo bed dividing member extending between the first module and the second module.

22. The support structure of claim 1 wherein the first cavity third wall portion resides within the first cavity.

23. The support structure of claim 1 wherein the cargo bed dividing member rests on the first cavity third wall portion and abuts the first cavity second wall portion when the cargo bed dividing member is in the pre-support position within the first cavity.

24. The support structure of claim 1 wherein the first cavity first wall portion has a first length and the first cavity second wall portion has a second length greater than the first length.

25. The module of claim 7 wherein the module is formed separately from and securable to a bed liner which is securable in the cargo bed.

* * * * *